Aug. 19, 1969     H. W. BLETZ     3,462,722
THERMOSTATIC CONTROL WITH ADJUSTING CAM
Filed Nov. 16, 1966     2 Sheets-Sheet 1
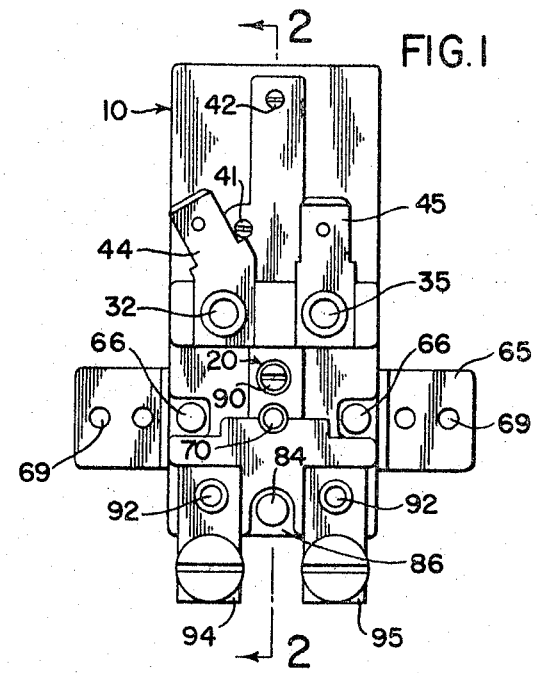
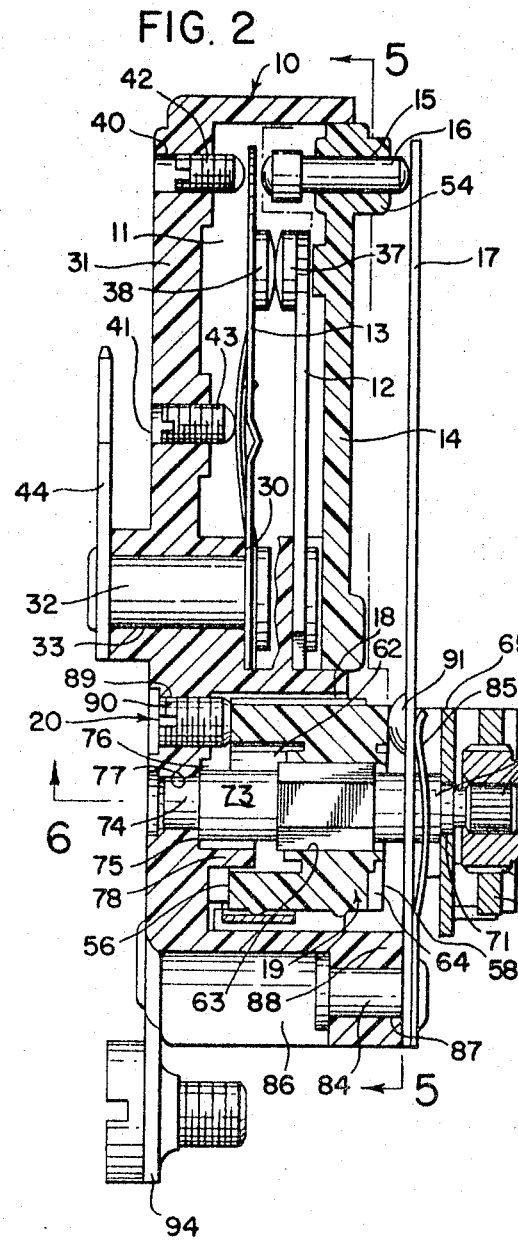
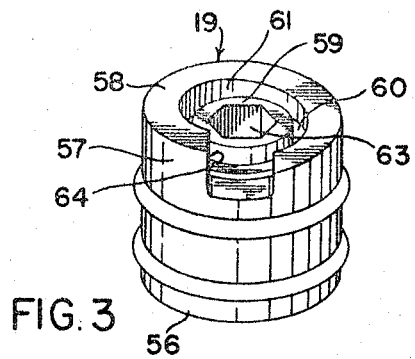
INVENTOR.
HOWARD W. BLETZ
BY
*Adrian Medert*
ATTORNEY

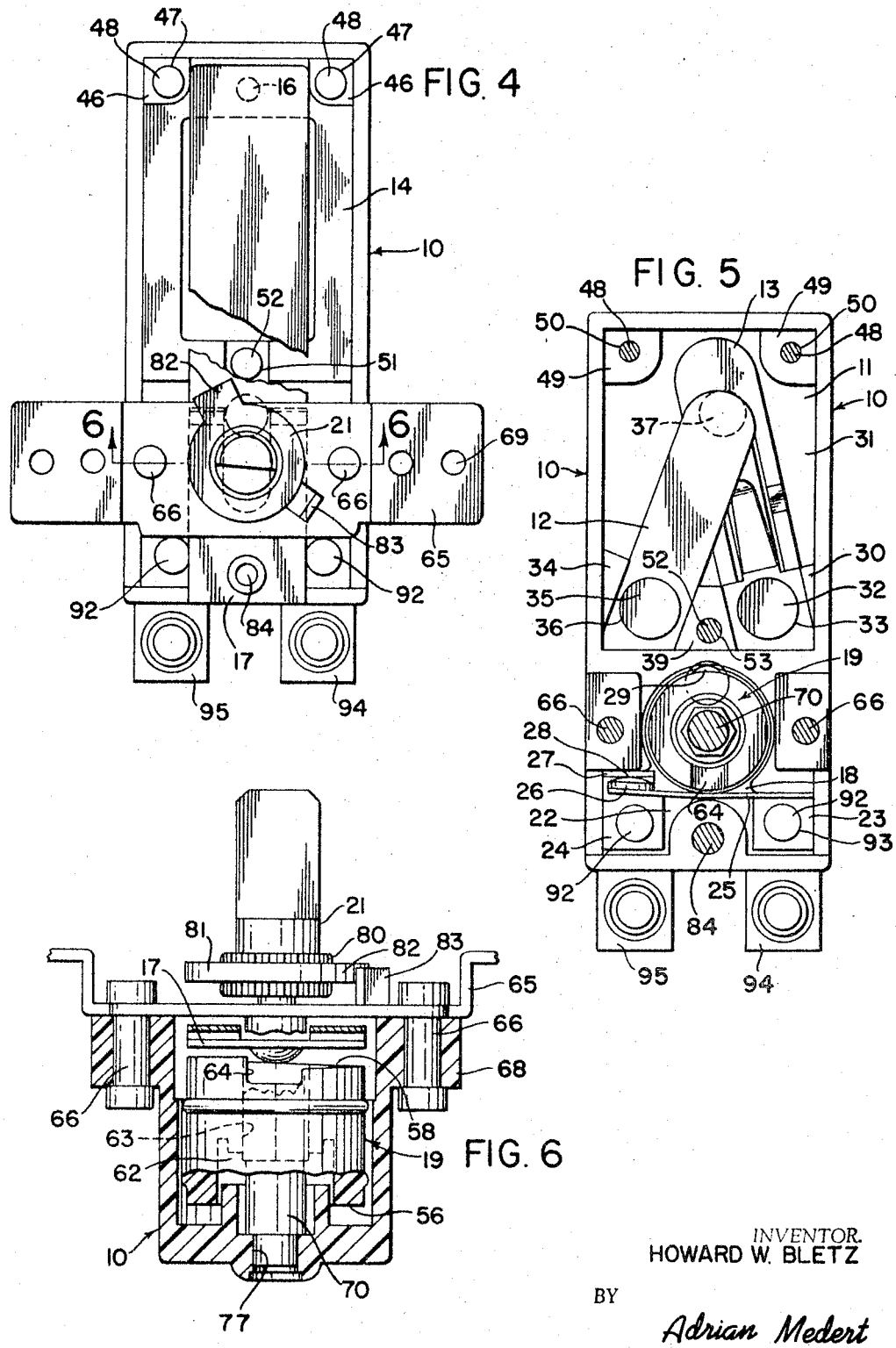

United States Patent Office 3,462,722
Patented Aug. 19, 1969

3,462,722
THERMOSTATIC CONTROL WITH ADJUSTING CAM
Howard W. Bletz, Washington Township, Richland County, Ohio, assignor, by mesne assignments, to Therm-O-Disc, Incorporated, Mansfield, Ohio, a corporation of Ohio
Filed Nov. 16, 1966, Ser. No. 594,868
Int. Cl. H01h 37/12
U.S. Cl. 337—347      11 Claims

ABSTRACT OF THE DISCLOSURE

A thermostatic control embodying a switch wherein a cam element is employed to adjust the operating temperature range of the device. Calibration of the control is effected by adjusting screw which positions the cam element axially and fixes the position of the camming surface of the cam element with respect to the bimetallic arm.

This invention relates to thermostatic controls and more particularly to a thermostatic control embodying a switch wherein a cam element is employed to adjust the operating temperature range of the device.

Heretofore, it has been recognized as desirable to include in a thermostatic control some means of varying the position of, or the pressure applied to, a bimetallic element so that adjustment of the operating range of the control could be achieved. For example, in the thermostatic controls in which a bimetallic blade causes a switch element which may be an over center type snap element to operate, several methods of achieving adjustments have been employed heretofore. For instance, one method of effecting adjustments was to mount either the stationary or the mobile contact of the switch on the end of a threaded adjustment screw. This practice was not entirely satisfactory, however, due to the frequent poor electrical connection between the threads of the screw and the hole in which it was mounted. Another method of achieving adjustments was to vary the pressure on a spring member which acted on the over center element carrying one of the switch contacts; this practice produced an overstressed condition in the spring member, resulting in instability and inaccuracy in calibration. Still another practice was to keep the bimetallic element stationary, and move many of the components of the switch with respect to the bimetallic element. Such a consruction was complicated and costly, however, and can be achieved only with an excessive number of parts.

The present invention provides for adjustment of the operating range of a control by means of the use of a cam element which acts directly upon an element of the device. The invention overcomes the drawbacks and disadvantages of prior practices noted above which follow from other forms of construction, and also effects either linear or non-linear movement of a bimetallic element or a switch element with respect to any given units of angular rotation of the cam element. Thus, the use of a cam element provides great flexibility in the design of the thermostatic control.

It is among the objects of this invention to provide a thermostatic control in which adjustment may be achieved easily and uniformly and without varying the operative functions of any of the other components of the control.

It is a further object of this invention to provide a thermostatic control in which there can be substantial flexibility in the amount or degree of adjustment achieved.

It is a still further object of the inveniton to provide in a thermostatic control primary adjustment means by which initial calibration of the control is obtained, which means is free from distortion influences caused by a secondary adjustment means associated therewith.

Another object of the invention is to provide in a thermostatic control a camming element operable upon a bimetallic element having primary adjusting means for fixing the axial position of the element with respect thereto and manually actuated secondary adjusting means for fixing the temperature at which the control will operate.

These and other objects and advantageous features of the invention, not at this time more particularly pointed out, will become apparent as the nature of the invention is better understood from the following detailed description, taken in conjunction with the accompanying drawings, wherein like reference characters denote corresponding parts, and wherein:

FIGURE 1 is a rear elevational view of a thermostatic control embodying the present invention, FIGURE 2 is an enlarged sectional view taken along the line 2—2 of FIGURE 1, FIGURE 3 is a perspective view of the cam element used in the thermostatic control shown in FIGURE 1, FIGURE 4 is an enlarged front elevational view of the thermostatic control shown in FIGURE 1, with portions cut away and removed, FIGURE 5 is a sectional view of the thermostatic control, taken along the line 5—5 of FIGURE 2 and drawn to the scale of FIGURE 4, and FIGURE 6 is a sectional view of the thermostatic control, taken along the line 6—6 of FIGURE 2 and drawn to the scale of FIGURE 4.

With reference to the drawings and particularly FIGURE 2, a thermostatic control made in accordance with the teachings of the present invention comprises a housing 10 defining a switch chamber 11 in which there is a cantilever mounted stationary contact carrying arm 12 and a cantilever mounted over center snap element 13 serving as the mobile contact carrying arm. A closure plate 14 for the switch chamber 11 is provided with a suitable opening 15 therethrough which slidably receives a cylindrical bumper member 16.

A cantilever mounted bimetallic arm 17 supported on the housing 10 exterior of the switch chamber 11 is arranged to cause the bending movement of the bimetallic arm 17 to be transferred through the bumper 16 to the over center snap element 13.

The housing 10 defines a second chamber 18, generally cylindrical in shape and separate from the chamber 11, in which there is mounted a cylindrical cam element 19 (FIGURE 5). Calibration of the control is effected by a primary adjusting means 20 which positions the cam element axially within the chamber 18 and fixes the position of the camming surface of the cam element with respect to the bimetallic arm 17. Extending upwardly from the center of the cam element 19 is a secondary adjusting means including a manually actuated member 21 which engages the cam element 19 in a manner to cause the cam element 19 to rotate therewith. The cam element 19 is so constructed and positioned as to cause movement of the free end of the bimetallic element 17 when the cam element 19 is rotated. Thus, secondary adjustment of the control can be achieved through rotation of the member 21.

As an optional feature a second electrical circuit may be built into the control. With reference to FIGURE 5, the housing 10 defines a third chamber 22 in communication with the cylindrical cam chamber 18 having a switch mounted therein including spaced terminals 23 and 24 secured in the opposed ends of the chamber 22. The terminal 23 is angulated and is formed with an arm 25 which spaces the distance between the terminals and supports a contact 26 on the outer free end thereof.

Similarly the terminal 24 is angulated and has an upstanding arm 27 on which is formed a contact receiving surface 28 for engagement with the contact 26. The arm 25 is biased in a manner to cause the contact 26 mounted on its end to be normally in engagement with the surface 28. However, the arm 25 is so situated that when the cam element 19 is rotated to a proper position, a longitudinally extending projection 29 integrally formed on the surface of the side wall of the cam element will engage the arm 25 and deflect and break the engagement between the contact 26 and the contact surface 28. The projection 29 may be formed at any point on the outer wall surface of the cam element 19. Thus this second, optional electrical circuit may be opened at any temperature with respect to the first electrical circuit simply by forming the projection 29 at a predetermined position. The positioning of the projection 29 does not effect the action of the cam element on the bimetallic arm 17.

Referring now more particularly to FIGURES 2 and 5 of the drawings, the housing 10 is generally rectangular in shape and defines a similarly shaped switch chamber 11. Within the chamber 11 at one side of the end adjacent to the cam chamber 18, there is formed a pad providing an elevated supporting surface 30, spaced sufficiently from the surface of the bottom wall 31 of the chamber 11 to allow adequate room for the movement of the over center snap element 13. The over center arm 13 is cantilevered from the mounting surface 30, being held in place by a terminal rivet 32 which extends downwardly through an opening 33 in the bottom wall 31 of the switch chamber 11. As appears in FIGURE 5, the arm 13 angles from one corner of the chamber 11 toward the center thereof.

A second supporting surface 34, located in the opposite corner of the chamber 11 and spaced from the surface of bottom wall 31 a greater distance than supporting surface 30 provides an area from which the stationary contact carrying arm 12 may be cantilevered. A second terminal rivet 35 extending through an opening 36 in the bottom wall of the housing 10 secures the arm 12 in position on the surface 34. Similar to the over center snap arm 13, the arm 12 angles from the corner in which it is mounted toward the center of the chamber 13. The free end portions of the arms 12 and 13 overlap as shown in FIGURE 5. A contact button 37 is mounted on the lower surface of the arm 12, directly above the contact button 38 which is mounted on the supper surface of the arm 13. Between the supporting surfaces 30 and 34 is angulated shoulder 39, which will be referred to hereinafter.

Spaced threaded openings 40 and 41, extending through the bottom wall 31 of the switch chamber receive adjusting screws 42 and 43, respectively. Adjustment screw 42 is positioned so as to be operable on the outer free end of the over center arm 13, while screw 43 is positioned so that pressure may be applied against the center strip of the over center arm 13.

Mounted on the ends of terminal rivets 32 and 35 exteriorly of the switch chamber 11 are terminal members 44 and 45, respectively, as shown in FIGURES 1 and 2. The terminal members 44 and 45 may be of whatever size, shape, or configuration desired, depending upon the particular installation of the control.

The closure plate 14 is generally rectangular in shape (FIGURE 4). Recesses 46 are formed at the corners of one end of the plate 14 through which extend openings 47 for receiving drive pins 48 adopted to anchor into pedestals 49 formed integrally with the housing 10 within the switch chamber 11 for securing the plate 14 to the housing, and for this purpose suitable openings 50 extend downwardly into the pedestals 49. For a similar purpose another opening 51, shown in FIGURE 4, permits another drive pin 52 to be anchored in an opening 53 in the shoulder 39. The mounting plate 14 is formed with an integral cylindrical collar 54 on each side thereof surrounding the opening 15 and serves as a guide for the bumper 16.

The cam element 19 is illustrated in FIGURES 2, 3, and 6. Beginning from a flat bottom surface 56, the generally cylindrical cam element 19 rises along its outer perimeter portion 57 to form a camming surface 58 varying in height above the bottom surface 56. An inner cylindrical hub 59 is integrally joined with the outer portion 57 by a web portion 60. Recessions 61 and 62 are formed between the outer portion 57 and hub 59 of the cam element 19 on opposite sides of the web 60, as appears in FIGURES 2 and 3. A hexagonal opening 63, extends axially through the hub 59. The camming surface 58 is formed with a curved recession 64, as appears in FIGURE 3, for a purpose to be described hereinafter. If the alternate second electrical circuit controlled by the switch in the chamber 22 is to be included in the control, the projection 29 will be formed on the wall of outer portion 57 of the cam element 19.

For mounting the control in an appliance a bracket 65 is provided which may take any suitable shape such as the U-shaped bracket shown in FIGURES 4 and 6. The bracket 65 is secured to the housing 10 by means of rivets or studs 66 extending through appropriate openings in blocks 68 formed integrally with the side walls of the housing and extending thereabove. Openings 69 in the bracket 65 are provided to permit it to be mounted or attached to the appliance.

For rotating the cam element 19 there is provided a cam shaft 70 which extends through an opening 71 in the mounting bracket 65 and thence through the hexagonal opening 63 of the hub 59. That portion of the shaft 70 engaging within the hexagonal opening 63 is also hexagonal so that rotation of the shaft 70 will cause the cam 19 to rotate. The stem 72 at the top of the shaft 70 is serrated, as appears in FIGURE 2, to receive the adjusting member 21. Between the outer free end of the shaft 70 and the hexagonal section thereof the shaft is formed with two coaxial cylindrical portions 73 and 74, the latter being of smaller diameter than the other. The shoulder 75 formed between the two cylindrical portions of the shaft seats in a circular recess 76 formed in the bottom wall of the cam chamber 18, while the lower portion 74 of the cam shaft 70 is journaled in cylindrical recess 77 in the bottom of recess 76. A circular wall 78 rises from the bottom wall of the chamber 18 concentric with recess 76 and partially surrounds the cylindrical portion 73 of shaft 70.

The manually actuated member 21 fits over the serrated stem 72 of cam shaft 70 as shown in FIGURE 2 and may receive any suitable knob or lever as desired. As shown in FIGURE 6, the member 21 is provided with a serrated section 80, which receives a collar 81 having an outwardly extending arm 82. Projecting upward from the mounting bracket 65 is a vertical stop 83 which engages the arm 82 to limit the rotation of the shaft 70.

The bimetallic arm 17 is secured to the housing 10 by means of a rivet 84 located near the end of the housing adjacent the cam element. Rivet 84 also secures a bifurcated spring member 85, the legs of which traverse the cam shaft, and exert a downward force on the bimetallic arm 17. One end of the rivet 84 is disposed in a cutaway portion 86 of the housing 10, as appears in FIGURE 2. The rivet 84 extends through an opening 87 in a mounting block 88, integrally formed with the end wall of the housing 10 within the switch chamber 22.

The primary adjusting means 20 includes a threaded opening 89 (FIGURE 2) extending upwardly through the bottom wall of the cam chamber 18 which receives an adjustment screw 90. The end of the screw 90 bears against the lower surface 56 of the cam element 19. A dimple 91, formed by making a depression in the bimetallic arm 17, bears against the camming surface 58, preferably in axial alignment with the adjustment screw 90. The screw 90 permits the vertical position of the cam element 19 to be varied, and together the aligned screw 90 and the dimple 91 act on the cam element 19 in such manner as to prevent binding while the cam 19 is being moved axially or rotated. The dimple 91 also fits into the recession 64 of the camming surface when the cam is rotated to the proper location; and when this occurs the force exerted by the spring member 85 on the bimetallic arm 17 is sufficient to ensure that the electrical contacts 37 and 38 will be open. Thus, an operator can simply turn the adjustment member 21 until he hears or feels the dimple 91 enter the recession 64, and be assured that the electrical circuit is broken.

With reference to FIGURE 5, the terminal posts 23 and 24, which are optional as has been described above, are secured in the chamber 22 of the housing 10 by means of rivets 92 which extend through suitable openings 93 in the bottom of the chamber 22. Through the rivets 92 the terminal posts 23 and 24 are connected to terminals 94 and 95, respectively to which may be connected lead-in wires from any suitable source of electrical current.

The operation of the control may be readily understood by reference to the drawings in conjunction with the description given above. The bumper 16 rests on the outer end of the over center snap element 13, and is acted upon by the bimetallic arm 17. The temperature at which the bimetallic arm 17 begins to bend sufficiently to apply force to the arm 13 through the bumper 16 may be varied by means of the adjustment screw 90. The amount of force required to cause the over center snap arm 13 to snap to a contact-open position may be varied by means of the adjustment screw 43. The distance traveled by the end of the over center arm 13 when the arm 13 snaps, and thus the force required to cause the arm 13 to snap to the contact-closed position, is adjustable through the screw 42. With all of the adjustment screws 90, 43, and 42 on the same side of the housing 10, calibration is relatively simple. Because any desired contour may be formed on the camming surface 58 of the cam element 19, the control may be assembled so that the deflection of the bimetallic arm 17 is either linear or non-linear with respect to the rotation of the cam element 19, as desired. Further, two separate electrical circuits may be controlled by the cam, if desired. The construction described permits good electrical contact between the switch components, and avoids risk of overstressing the over center snap element or any spring member acting on it.

While there has been described in detail herein and illustrated in the accompanying drawings, a presently preferred embodiment, it is to be understood that various modifications and refinements which depart from the illustrated embodiment may be adopted without departing from the spirit and scope of the invention.

I claim:
1. A thermostatic control device comprising a housing, switch means in said body including a snap acting switch on said housing and an elongated bimetallic element mounted on said housing, connecting means between said bimetallic element and said switch operable to actuate said switch in response to thermally induced forces created by said bimetallic element, and temperature adjusting means connected to said switch means operable to adjust the operating temperature of said control device, said temperature adjusting means including a manually operable stem assembly journaled in said housing for rotation about an axis, a cam, and a drive connection between said stem assembly and cam, said drive connection preventing relative rotation between said stem assembly and said cam while permitting relative axial motion therebetween whereby said cam is free to move axially relative to said stem assembly, said cam providing opposed end faces around said axis with the spacing between aligned portions thereof progressively changing at progressive locations around said axis, projecting means on said switch means spaced from said axis engaging one of said end faces of said cam, a calibration element in said housing aligned with said projecting means engaging an aligned portion of the other of said end faces of said cam, said calibration element adjustably determining the position of said cam along said axis, adjustment of said calibration element adjustably determining the temperature at which said bimetallic element causes said switch to operate when said stem assembly is in a predetermined position.

2. A thermostatic control device as set forth in claim 1 wherein said temperature adjusting means is connected to said bimetallic element and said projecting means are formed on said bimetallic element.

3. A thermostatic control device as set forth in claim 1 wherein said snap acting switch includes an elongated first contact support mounted at one end in said housing, a first contact mounted substantially adjacent to the other end of said first contact support, an elongated snap element mounted at one end in said housing, a second contact mounted substantially adjacent to the other end of said snap element for movement between a contact closed position in which said contacts are in engagement and a contact open position in which contacts are spaced from each other, a first calibration element in said housing on the side of said snap element removed from said first contact adjustably limiting the movement of said second contact in a direction away from said first contact and thereby adjustably determining the amount of spacing between said contacts when said contacts are in said contact open position, a second adjustable calibration element in said housing on the same side of said snap element as said first calibration element, said second calibration element adjustably engaging said snap element intermediate its one end and the location of said second contact thereon, adjustment of said second calibration element determining the force of said snap element tending to move said second contact toward one of said contact positions, and a coupling between the free end of said bimetallic element and the free end of said snap element operable to transmit a thermally induced force therebetween.

4. A thermostatic control device as set forth in claim 1 wherein said housing defines a switch chamber in which said switch is located, said housing also defining a cam chamber adjacent to said switch chamber, said cam being located in said cam chamber.

5. A thermostatic control device as set forth in claim 4 wherein said bimetallic element is cantilever mounted on said housing and traverses said switch chamber and said cam chamber.

6. A thermostatic control device as set forth in claim 1 wherein said housing defines a switch chamber, said switch including contact carrying arms cantilever mounted at opposite sides of one end of said switch chamber and converging toward the other end of said switch chamber terminating one above the other, and contact buttons on the opposite free ends of said arms, one of said arms being an over center snap element.

7. A thermostatic control device as set forth in claim 6 wherein said bimetallic element traverses said switch chamber and exerts pressure on the over center snap element to open the contact buttons.

8. A thermostatic control device as set forth in claim 3 wherein all of said calibration elements are screws threaded into said housing, all of said screws being accessible from the same side of said housing.

9. A thermostatic control device as set forth in claim 1 wherein said other end face of said cam member is contained in a plane perpendicular to said axis.

10. A thermostatic control device as set forth in claim 1 wherein a switch is mounted in said housing, and said cam is provided with a radial projection operable to operate said switch when said cam is rotated to a selected position.

11. A thermostatic control device as set forth in claim 10 wherein said one end face of said cam is formed with a recess, and said projecting means are located in said recess when said cam is in said selected position.

References Cited
UNITED STATES PATENTS
2,878,344  3/1959  Gustafson et al. _____ 200—139
3,239,633  3/1966  Bletz _____ 200—139

BERNARD A. GILHEANY, Primary Examiner

R. L. COHRS, Assistant Examiner

U.S. Cl. X.R.

337—361, 375